United States Patent [19]

Reid

[11] Patent Number: 4,481,970

[45] Date of Patent: Nov. 13, 1984

[54] TIRE VALVE
[75] Inventor: Philip L. Reid, Duncan, S.C.
[73] Assignee: Jack H. Zabel, Jr., Simpsonville, S.C.
[21] Appl. No.: 387,154
[22] Filed: Jun. 10, 1982
[51] Int. Cl.³ .............................................. F16K 19/00
[52] U.S. Cl. ................................ 137/223; 137/234.5; 137/853
[58] Field of Search ...................... 137/223, 234.5, 853

[56]  References Cited
U.S. PATENT DOCUMENTS

| 560,492 | 5/1896 | Gibbs | 137/223 |
|---|---|---|---|
| 1,969,224 | 8/1934 | Lear | 137/223 |
| 2,188,713 | 1/1940 | Gora | 137/223 |
| 3,310,064 | 3/1967 | Voos | 137/234.5 |

FOREIGN PATENT DOCUMENTS 496783 10/1953 Canada ................................ 137/223

Primary Examiner—Harold W. Weakley
Attorney, Agent, or Firm—Bailey & Hardaway

[57] ABSTRACT

A valve which is substantially leak proof and resistant to road soil and grime comprises a collapsible sleeve and a pin member to prevent leakage, but which is effective to permit inflation and deflation upon movement of the pin so as to dislodge an enlarged end portion from contact with one end of the sleeve.

3 Claims, 3 Drawing Figures

TIRE VALVE

BACKGROUND OF THE INVENTION

This invention relates generally to the art of automobile and truck tires and relates more particularly to a novel valve assembly therefor.

Within the trucking industry alone significant sums are expended for the sole purpose of maintaining vehicle tires at a safe operating pressure. Conventional valve assemblies permit sufficient leakage of pressurized fluid from pneumatic tires to make it mandatory to spend significant personnel time measuring and maintaining safe tire pressure. This problem is exacerbated by the tendency of maintenance personnel and mechanics in general to neglect replacement of end caps, which are adapted to seal the internal portion of the valve stems from exposure to atmosphere and environmental soil. With the absence of such end caps, road soil enters the conventional cores of such mechanisms to impair the normal operation thereof. The presence of environmental soil increases leakage through the valve assembly and further increases the expenses associated with the maintenance of appropriate presesures within truck tires.

Similar problems are associated with automobile tires, but not to the same extent experienced in the trucking industry. Various prior art valves and valve assemblies have attempted to overcome the problems associated with leakage through the valve stem assemblies.

One solution to this problem is disclosed in U.S. patent application Ser. No. 344,981 of Feb. 2, 1982 to Mr. John H. Zabel, Jr. the disclosure of which is hereby incorporated by a reference.

U.S. Pat. No. 1,956,981 to Crowley discloses a valve mechanism which attaches over an existing valve stem and has a sealing member which is an attempt to circumvent the problems associated with the failure to reattach end caps during normal maintenance. The mechanism disclosed in this patent however is still subject to fouling by road grime and soil.

U.S. Pat. No. 614,968 to Mohs discloses the use of a flexible sleeve with slits for the introduction and exhausting of pressurized fluid. Normally the high pressure side of the valve collapses the sleeve about a rod. If the rod is extracted from the valve assembly, the tube is expanded to permit the pressurized fluid to flow through slits and to exit the pneumatic tire.

U.S. Pat. No. 404,400 to DeWolfe discloses a valve for a bicyle tire comprising a central plug having an axial orifice communicating with a circumferential groove for the purpose of inflating the bicycle tire through the orifice groove. The tire is prevented from deflating by the collapse around the circumferential groove of a rubber sleeve.

Another patent showing the use of a rubber sleeve about a central core having an orifice therethrough in U.S. Pat. No. 1,469,966 to M. C. Schweinert. French Pat. No. 569,081 to Medini also discloses a sleeve structure within a valve.

U.S. Pat. No. 2,778,374 to Boyer discloses a more conventional valve for use on large tires.

While the aforementioned prior art mechanisms possess unique advantages, there has been no commercially available tire valve, particularly to the trucking industry, which remedies the problems discussed above.

SUMMARY OF THE INVENTION

It is thus an object of this invention to provide a novel valve which is not susceptible to fouling due to road soil and grime.

It is a further object of this invention to provide a valve particularly suited for truck tires and which does not require the presence of an end cap in order to maintain its functionality.

It is a still further and more particular object of this invention to provide such a valve having the ability to prevent leakage of any significance from a vehicle tire.

These as well as other objects are accomplished by a valve having an elastomeric sleeve surrounding an axial pin which passes through one end of the sleeve and extends through the other end thereof with an enlarged end biased against the opening at the other end of the sleeve to prevent egress of fluid through the sleeve. Exhausting of fluid is permitted when the enlarged end is moved away from the other end against the biasing thereof in order to permit fluid to flow between the pin and the sleeve. During normal biasing of the enlarged end of the pin against the opening in the other end of the sleeve, the sleeve is collapsed about the pin due to the pressure differential.

Detailed Description

Figure 1:
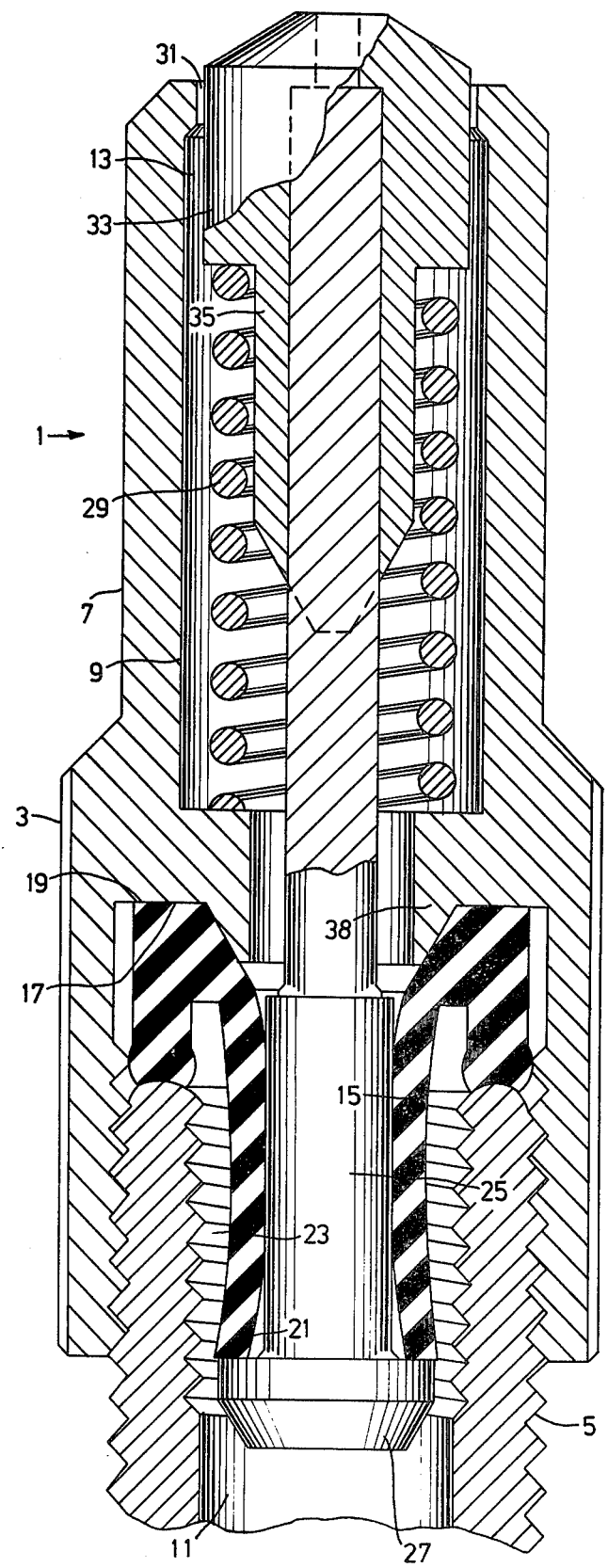
FIG. 1 is a cross section view of a valve in accordance with this invention in the closed position.

In accordance with this invention it has been found that a valve for use on vehicle tires may be made substantially resistant to any adverse effects associated with exposure to road soil and grime. In a large measure this advantageous and surprising result is brought about by the ability of the valve to permit passage therethrough of such soil and grime while having a large sealing area to prevent leakage. The sealing area in accordance with this invention is such that any localized contamination would not have a significant effect upon the overall sealing capability of the valve. Various other advantages of the valve in accordance with this invention will become apparent from the following description given with reference to the various figures of the drawing.

FIG. 1 of the drawings illustrates valve 1 in the normally closed position in accordance with this invention. The valve 1 comprises a housing generally designated as 3 but which as illustrated here includes a portion of a conventional valve stem 5 as well as a valve stem extension 7. As illustrated the valve stem extension 7 is the preferred form of this invention wherein the valve within the valve stem extension is merely an addition to the conventional valve stem. It is understood however that the valve in accordance with this invention maybe produced as an original valve so as to have a more permanent connection between components thereof.

Housing 3 generally defines through the hollow 9 thereof a source of communication between a normally high pressure area 11 and low pressure area 13 when the valve in accordance with this invention is in an open position, but which is otherwise noncommunicative between the areas when the valve is in the normally closed position as is illustrated in FIG. 1.

Figure 2:
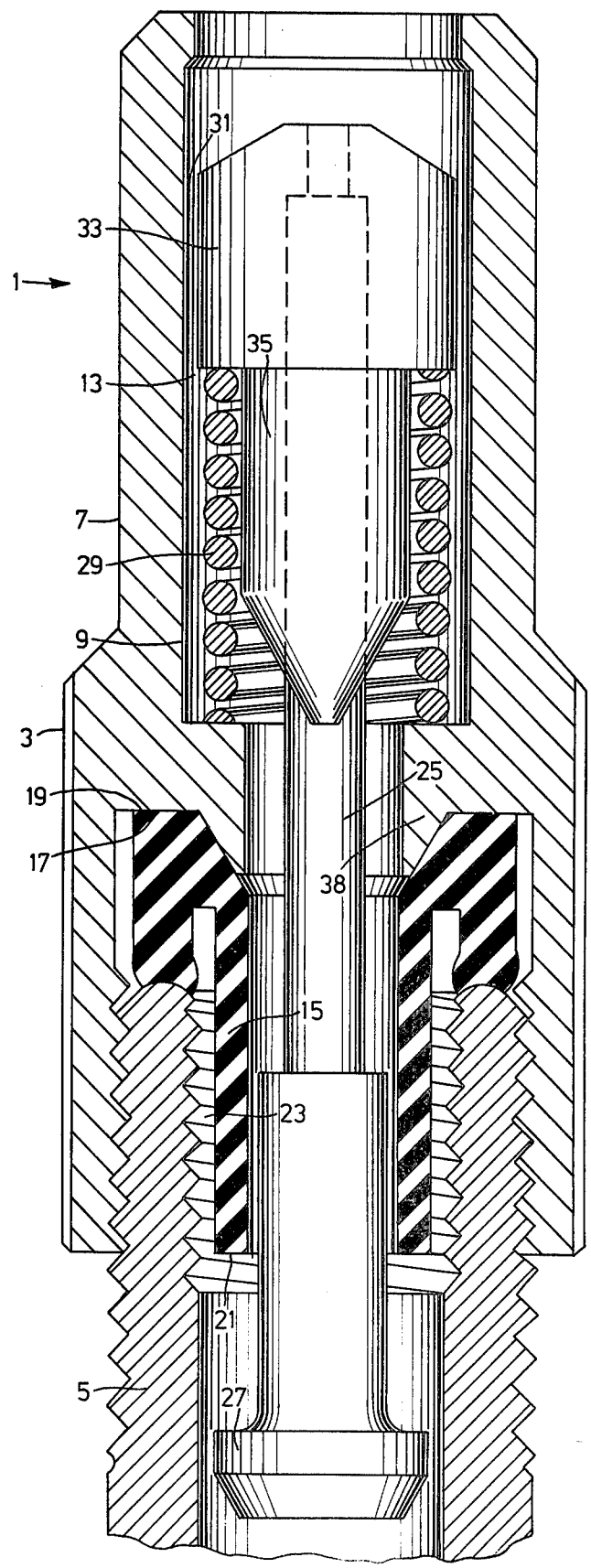
FIG. 2 is a view similar to FIG. 1 showing the valve in the open position.

Within the hollow 9 is a generally hollow elastomeric sleeve 15 which is hermetically engaged with the hollow 9 at 17. The hermetic engagement as illustrated in FIG. 1 may comprise the use of an adhesive or mechanical interlock at one end 19 of elastomeric sleeve 15 and mechanical gripping between conventional valve stem 5 and valve stem extension 7. The other end 21 of sleeve 15 is generally spaced from the interior wall of housing 3 so as to have a space 23 defined between the interior wall and the sleeve which is generally in fluid communication with high pressure area 11. As illustrated in FIG. 1 of the drawings, sleeve 15 is in a generally collapsed state due to the high pressure from high pressure area 11. FIG. 2 of the drawings, however, illustrates sleeve 15 in a non-collapsed state.

Sleeve 15 may be constructed of an elastomeric material which may be any of the conventional elastomeric materials, such as, styrene butadiene rubber, polyisoprene, ethylenepropylene-diene, isoprene polymer, butyl rubber, polyacrylonitrile, polysiloxane, epichlorolhydrin or polyurethane.

Within sleeve 15 is a cylindrical pin 25 which is axially located within the hollow of the elastomeric sleeve 15. The diameter of pin 25 is less than the inside diameter of sleeve 15. This is best illustrated in FIG. 2 of the drawings wherein sleeve 15 is not in contact with pin 25.

Pin 25 has an enlarged end 27 which is of a greater diameter than the inside diameter of sleeve 15 and which extends beyond the other end 21 thereof. Enlarged end 27 is normally biased against the other end 21 of sleeve 15 by biasing means 29. Such biasing causes enlarged end 27 when in engagement with end 21 to preclude fluid communication between high pressure area 11 and low pressure area 13. It has surprisingly been found that when this engagement exists and when there is a pressure differential, sleeve 15 collapses about pin 25 to have a large seal area defined by the contact area therebetween. There is thus with this invention a dual seal between the high pressure area 11 and low pressure area 13. The first seal is formed by the engagement of enlarged end 27 with end 21 of sleeve 25. The second seal is formed by the collapse of sleeve 15 about pin 25 due to the pressure differential therebetween.

Pin 25 extends through opening 31 for purposes of contacting the central pin of a conventional air hose.

The inflation mode of the valve in accordance with this invention may be best seen in FIG. 2 of the drawings wherein pin 25 is in a depressed state such that enlarged end 27 is disengaged from contact with end 21 of sleeve 15. This dislodgement is against the biasing of biasing means 29 such that once the force associated with movement of pin 25 is released, enlarged end 27 again recontacts end 21 of sleeve 15. The biasing means 29 as illustrated here is a compression spring which forces end 33 of pin 25 through opening 31.

The configuration of the FIG. 2 illustration is also the deflation mode of the invention. When enlarged end 27 is moved away from end 21 communication is established between high pressure area 11 and the area between sleeve 15 and pin 25 so as to break the seal therebetween and permit fluid communication therethrough for purposes of deflation.

In prior art devices it has been conventional to have the end of a pin generally lodged within a housing so as to constitute a second seal at the opening thereof. However for purposes of this invention it is preferred to not have such a contact area since any debris which might be deposited upon the pin would tend to dislodge the pin in the direction of the high pressure area and thus create a leak.

With the valve of this invention, it is thus seen that any debris which enters the valve structure is either lodged at some point which is unharmful or is swept entirely through the valve into the high pressure area. If any debris is lodged on the interior surface of sleeve 15, it will be non deleterious to the sealing function thereof since the sealing area defined by the contact of the inner walls of sleeve 15 and pin 25 is extensive in comparison to the size of any debris which might fit through opening 31.

It is surprising and unexpected that enlarged end 27 and the pressure differential between high pressure area 11 and low pressure area 13 cooperates to cause sleeve 15 to collapse about pin 25 in a manner so as to preclude fluid communication between such high and low pressure areas.

Figure 3:
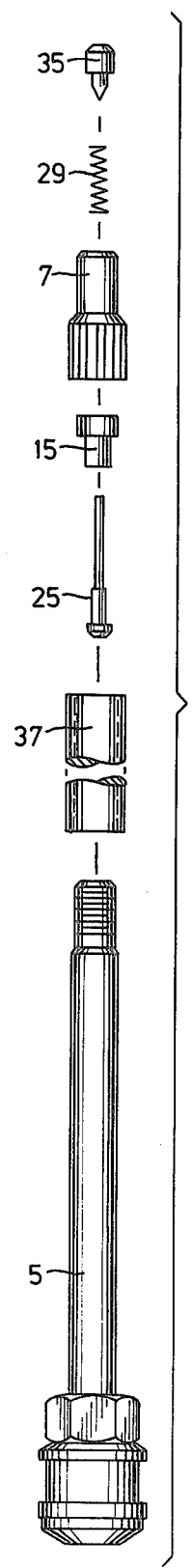
FIG. 3 is an assembly view of the valve in accordance with this invention.

As a further aid to understanding the valve in accordance with this invention an assembly view is illustrated in FIG. 3 of the drawings. It should be noted that pin 25 preferably is assembled in two pieces with end piece 35 being adhered or mechanically joined. Also illustrated in FIG. 3 is spacer 37 which may be utilized in order to assure a proper positioning between conventional stems 5 and stem extension 7.

The spacer 37 is utilized to prevent undue distortion of end 19 when clamped between extension 7 and conventional stem 5. An alternative, is to provide a conical conforming abutment 38 to extension 7 so as to maintain the shape of end 19 regardless of the degree of compression caused by the closeness of extension 7 to stem 5.

As illustrated stem extension 7 preferably contains no external threads since the valve is equally efficatious with or without the presence of an end cap. However it is within the scope of this invention to include an eternally threaded end and an end cap thereon.

For purposes of guidance to those of skill in the art a preferred example is given of the relationship between sleeve 15 and pin 25.

EXAMPLE

An operable valve in accordance with this invention was constructed utilizing a stainless steel pin with an outer diameter within the sleeve of 0.061 inches and with an enlarged head outer diameter of 0.156 inches to fit within a formed buna N rubber sleeve with an inside diameter of 0.112 inches and outside diameter of 0.160 inches and an effective sealing length of 0.25 inches.

An unexpected phenomenon and advantage of this invention is that the filling rate lessens as the pressure within the tire increases. This facilitates fine tuning of the tire pressure at desired pressure while permitting rapid inflation at lesser pressures.

Having generally described the valve of this invention and a preferred embodiment thereof, it is thus seen that the valve in accordance with this invention provides a valve which is substantially leak proof, resistant to road soil and grime and obviates the need for an end cap. As many variations thereof will be apparent to those of skill in the art, such variations as are embodied within the spirit and scope of the following appended claims are within the scope of this invention.

What is claimed is:

1. A valve for separating a low pressure area from a high pressure area, comprising;

a hollow housing generally capable of establishing fluid communication through the hollow thereof between said low pressure area and said high pressure area;

a generally hollow elastomeric sleeve within the hollow of said housing and hermetically engaged therewith at one end thereof and with the other end thereof being generally unengaged thereby defining a space between said sleeve and said housing, said space being maintained in fluid communication with said high pressure area at all times, said sleeve portion exposed to said space having a length substantially greater than its diameter;

a cylindrical pin axially located within the hollow of said elastomeric sleeve, said cylindrical pin having a diameter of less than the diameter of the hollow of said elastomeric sleeve, but having an enlarged end of a greater diameter that the diameter of the hollow of said elastomeric sleeve, said cylindrical pin extending from said one end through said other end of said sleeve and said enlarged end portion being beyond said other end of said sleeve;

means for biasing said enlarged end against said other end of said hollow sleeve to preclude fluid communication between said high pressure area and said low pressure area when said enlarged end is in contact with said other end of said sleeve; and wherein, said enlarged end of greater diameter cooperates with said hollow elastomeric sleeve when in contact with the other end thereof to collapse said elastomeric sleeve about said cylindrical pin in the area thereof having said diameter less than the diameter of the hollow of said elastomeric sleeve to preclude fluid communication through said hollow elastomeric sleeve and the high pressure within said space maintaining said sleeve in a collapsed state about said cylindrical pin.

2. The valve in accordance with claim 1 wherein said cylindrical pin is movable axially within the hollow of said housing and said hollow sleeve so as to be responsive to a force and against the biasing of said biasing means to move said enlarged end out of contact with said other end of said hollow sleeve to thereby establish fluid communication between said high pressure area and said low pressure area.

3. The valve in accordance with claim 1 wherein said means for biasing comprises a compression spring biasing said cylindrical pin in the direction of said low pressure area.

* * * * *